US012327671B2

(12) United States Patent
Wakabayashi

(10) Patent No.: US 12,327,671 B2
(45) Date of Patent: Jun. 10, 2025

(54) COIL COMPONENT, CIRCUIT BOARD, AND ELECTRONIC DEVICE

(71) Applicant: TAIYO YUDEN CO., LTD., Tokyo (JP)

(72) Inventor: Hirotaka Wakabayashi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 429 days.

(21) Appl. No.: 17/036,094

(22) Filed: Sep. 29, 2020

(65) Prior Publication Data

US 2021/0098186 A1 Apr. 1, 2021

(30) Foreign Application Priority Data

Sep. 30, 2019 (JP) ................................ 2019-179237

(51) Int. Cl.

| | |
|---|---|
| ***H01F 27/29*** | (2006.01) |
| ***H01F 27/24*** | (2006.01) |
| ***H01F 27/28*** | (2006.01) |
| ***H01F 41/02*** | (2006.01) |
| ***H01F 41/04*** | (2006.01) |

(52) U.S. Cl.

CPC ............ *H01F 27/29* (2013.01); *H01F 27/24* (2013.01); *H01F 27/2804* (2013.01); *H01F 41/0233* (2013.01); *H01F 41/0246* (2013.01); *H01F 41/041* (2013.01); *H01F 2027/2809* (2013.01)

(58) Field of Classification Search

CPC .................................................... H01F 27/292

See application file for complete search history.

(56) References Cited

U.S. PATENT DOCUMENTS

| | | | | |
|---|---|---|---|---|
| 8,981,890 B2 * | 3/2015 | An | C01G 23/003 336/200 |
| 9,583,251 B2 * | 2/2017 | Moon | H01F 27/2804 |
| 2004/0084131 A1 * | 5/2004 | Anao | H01F 41/046 156/89.12 |
| 2014/0085037 A1 * | 3/2014 | Shin | H01F 41/046 156/89.12 |
| 2016/0035476 A1 | 2/2016 | Mimura et al. | |
| 2016/0307693 A1 * | 10/2016 | Cho | H01F 27/2828 |
| 2017/0110236 A1 * | 4/2017 | Jang | H01F 41/10 |
| 2017/0301458 A1 | 10/2017 | Mimura et al. | |
| 2018/0012696 A1 * | 1/2018 | Lee | H01F 17/0013 |

(Continued)

FOREIGN PATENT DOCUMENTS

| | | | |
|---|---|---|---|
| CN | 203013434 U * | 6/2013 | H01F 17/04 |
| CN | 107658095 A | 2/2018 | |

(Continued)

OTHER PUBLICATIONS

Notice of Reasons for Refusal dated Dec. 19, 2023, issued in corresponding Japanese Patent Application No. 2019-179237, with English translation (9 pgs.).

(Continued)

*Primary Examiner* — Mang Tin Bik Lian

(74) *Attorney, Agent, or Firm* — Pillsbury Winthrop Shaw Pittman, LLP

(57) ABSTRACT

A coil component according to one embodiment of the present invention includes: a magnetic base body; a conductor provided in the magnetic base body and wound around a coil axis; and first and second external electrodes connected by metallic bond to at least parts of first and second end portions of the conductor, respectively.

11 Claims, 7 Drawing Sheets

(56) References Cited

U.S. PATENT DOCUMENTS

| | | | | |
|---|---|---|---|---|
| 2018/0012700 | A1* | 1/2018 | Lee | H01F 17/0013 |
| 2018/0033540 | A1* | 2/2018 | Lee | H01F 41/041 |
| 2018/0122555 | A1* | 5/2018 | Kim | H01F 27/292 |
| 2019/0066905 | A1* | 2/2019 | Hong | H01F 41/043 |
| 2019/0122809 | A1 | 4/2019 | Mimura et al. | |
| 2019/0214182 | A1* | 7/2019 | Imada | H01F 41/043 |
| 2019/0214187 | A1* | 7/2019 | Imada | H01F 17/0013 |
| 2019/0333688 | A1* | 10/2019 | Song | H01F 27/2804 |
| 2019/0355508 | A1* | 11/2019 | Lim | H01F 17/0013 |
| 2020/0105462 | A1* | 4/2020 | Nogi | H01F 27/2823 |
| 2020/0152374 | A1* | 5/2020 | Sato | H01F 27/292 |
| 2020/0168388 | A1 | 5/2020 | Lee et al. | |
| 2020/0219644 | A1* | 7/2020 | Kim | H01F 17/04 |
| 2020/0357565 | A1* | 11/2020 | Li | H01F 27/2804 |
| 2020/0365312 | A1* | 11/2020 | Kim | H01F 27/29 |
| 2020/0365314 | A1 | 11/2020 | Mimura et al. | |
| 2022/0108828 | A1 | 4/2022 | Lee et al. | |

FOREIGN PATENT DOCUMENTS

| | | | | | |
|---|---|---|---|---|---|
| JP | H10-74661 | A | | 3/1998 | |
| JP | 2012-094585 | A | | 5/2012 | |
| JP | 2016-032050 | A | | 3/2016 | |
| JP | 2019-021907 | A | | 2/2019 | |
| JP | 2019-102471 | A | | 6/2019 | |
| KR | 101670184 | | * | 10/2016 | |
| KR | 20170032056 | | * | 3/2017 | |
| KR | 20180006246 | | * | 1/2018 | H01F 17/04 |
| KR | 20180006262 | | * | 1/2018 | H01F 17/0013 |
| KR | 101892849 | | * | 8/2018 | |
| WO | WO-2012086397 | A1 | * | 6/2012 | H01F 17/0013 |

OTHER PUBLICATIONS

Notice of Reasons for Refusal dated Jul. 4, 2023 issued in corresponding Japanese Patent Application No. 2019-179237, with English translation (8 pgs.).

Decision of Refusal dated Jun. 4, 2024, issued in corresponding Japanese Patent Application No. 2019-179237, with English translation (9 pgs.).

Notification of First Office Action dated Nov. 29, 2024, issued in corresponding Chinese Patent Application No. 202011029905.3, with English translation (14 pgs.).

* cited by examiner

COIL COMPONENT, CIRCUIT BOARD, AND ELECTRONIC DEVICE

CROSS-REFERENCE TO RELATED APPLICATIONS

This application is based on and claims the benefit of priority from Japanese Patent Application Serial No. 2019-179237 (filed on Sep. 30, 2019), the contents of which are hereby incorporated by reference in their entirety.

TECHNICAL FIELD

The present disclosure relates to a coil component, a circuit board, and an electronic device.

BACKGROUND

A conventional coil component such as an inductor typically includes a magnetic base body made of a magnetic material, a conductor provided in the magnetic base body and wound around a coil axis, and an external electrode connected to an end portion of the conductor. Such a coil component is used as a component of various electronic devices.

When an electronic device is operated and an electric current flows in the conductor of the coil component, Joule heat is produced in the conductor. As the electric current flowing in the conductor is larger, a larger amount of heat is produced. For an electronic device used in electric components of automobiles, the coil component serves at various environmental temperatures. Therefore, as a result of repeated thermal expansion and contraction of the coil component, strain is accumulated to cause fatigue.

In a coil component, bonding between the conductor and the external electrode connected to an end portion of the conductor should preferably be stable. It is required that bonding between the conductor and the external electrode be maintained even when, for example, strain is accumulated in the coil component due to thermal expansion or contraction. For example, Japanese Patent Application Publication No. 2019-102471 discloses that a conductive resin layer serving as an external electrode is connected to an end portion of the conductor having a sintered metal layer. The conductive resin layer is formed by printing a conductive paste on the sintered metal layer.

As described above, in conventional coil components, the external electrode is formed on an end portion of the conductor of the coil component by printing the conductive paste, and therefore, oxygen remains in a joint between the end portion and the external electrode. Due to oxygen remaining in the joint, oxidation occurs in the external electrode and the end portion of the conductor to produce an oxide. As a result, the external electrode unfavorably comes off the end portion of the conductor. Also, the oxide unfavorably increases the resistance in the joint.

SUMMARY

An object of the present invention is to solve or relieve at least a part of the above problem. One of specific objects of the present invention is to provide a coil component capable of suppressing reduction in electrical and mechanical reliability of bonding between the end portion of the conductor and the external electrode. Other objects of the present invention will be made apparent through the entire description in the specification.

A coil component according to one embodiment of the present invention includes: a magnetic base body; a conductor provided in the magnetic base body and wound around a coil axis; and first and second external electrodes connected by metallic bond to at least parts of first and second end portions of the conductor, respectively.

In one aspect, the first and second external electrodes each include a metal film and are connected via the respective metal films to the first and second end portions, respectively.

In one aspect, the metal film is a sputtered film.

In one aspect, an aspect ratio of metal particles constituting the metal film is 0.8 to 1.5, where a longitudinal direction of the metal particles is a thickness direction of the metal film, and a transverse direction of the metal particles is horizontal to a surface of the metal film.

In one aspect. an ionization tendency of a main ingredient of metals contained in the first and second external electrodes is smaller than that of metals contained in the first and second end portions.

In one aspect, the magnetic base body has a surface in which the first and second end portions are exposed.

In one aspect, the first and second end portions have first and second end surfaces, respectively, the first and second external electrodes are connected to the first and second end surfaces, respectively, and the first and second external electrodes are metal-bonded to at least peripheral portions of the first and second end surfaces, respectively.

In one aspect, the external electrodes contain an alloy including Cu, Ag, or at least one of Cu and Ag.

A circuit board according to one aspect of the present invention includes the above coil component.

An electronic device according to one aspect of the present invention includes the above circuit board.

Advantageous Effects

One aspect of the present invention is a coil component capable of suppressing reduction in electrical and mechanical reliability of bonding between the end portion of the conductor and the external electrode.

DESCRIPTION OF THE EMBODIMENTS

Various embodiments of the present invention will be hereinafter described with reference to the drawings. Elements common to a plurality of drawings are denoted by the same reference signs throughout the plurality of drawings. It should be noted that the drawings do not necessarily appear to an accurate scale for convenience of explanation.

Figure 1:
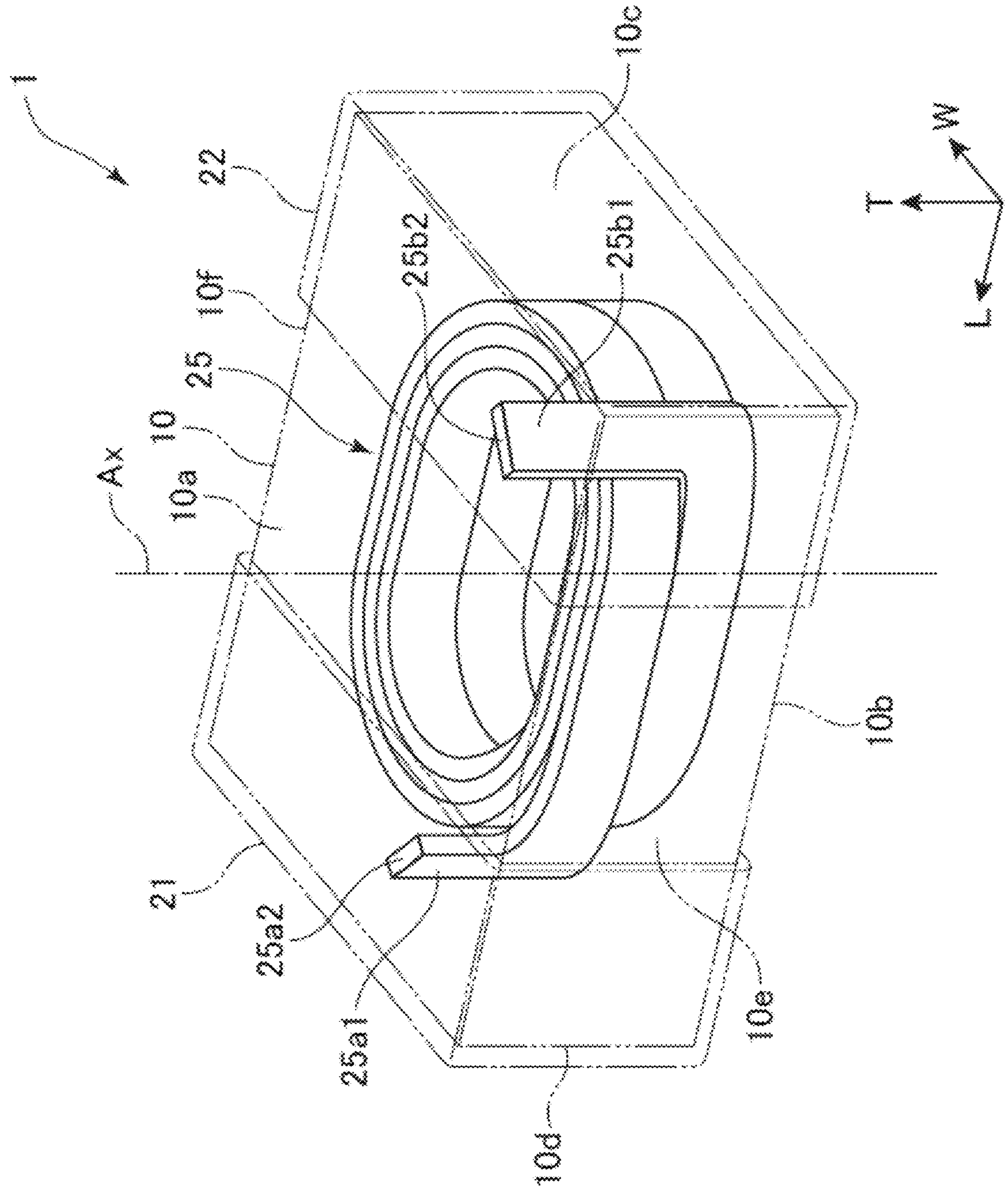
FIG. 1 is a perspective view schematically showing a coil component according to one embodiment of the present invention.

A coil component 1 according to one embodiment of the present invention will be hereinafter described with reference to FIGS. 1 to 6. First, with reference to FIG. 1, an outline is given of the coil component 1. FIG. 1 is a perspective view schematically showing the coil component 1. As shown, the coil component 1 includes a magnetic base body 10, a coil conductor 25 disposed in the magnetic base body 10, an external electrode 21 disposed on the surface of the magnetic base body 10, and an external electrode 22 disposed on the surface of the magnetic base body 10 at a position spaced apart from the external electrode 21.

In this specification, a "length" direction, a "width" direction, and a "thickness" direction of the coil component 1 are referred to as an "L axis" direction, a "W axis" direction, and a "T axis" direction in FIG. 1, respectively, unless otherwise construed from the context. The "thickness" direction is also referred to as the "height" direction.

The coil component 1 is mounted on a circuit board (not shown). The circuit board has two land portions provided thereon. The coil component 1 is mounted on the circuit board by bonding the external electrodes 21, 22 to the corresponding land portions. The circuit board includes the coil component 1 and a substrate 2. The circuit board can be installed in various electronic devices. Electronic devices in which the circuit board can be installed include smartphones, tablets, game consoles, and various other electronic devices. The circuit board may also be installed in an electric component of an automobile, which is a sort of electronic device.

The coil component 1 may be applied to inductors, transformers, filters, reactors, and various other coil components. The coil component 1 may also be applied to coupled inductors, choke coils, and various other magnetically coupled coil components. Applications of the coil component 1 are not limited to those explicitly described herein.

The magnetic base body 10 is made of a magnetic material and formed in a rectangular parallelepiped shape. In one embodiment of the invention, the magnetic base body 10 has a length (the dimension in the L axis direction) of 1.0 to 4.5 mm, a width (the dimension in the W axis direction) of 0.5 to 3.2 mm, and a height (the dimension in the T axis direction) of 0.5 to 5.0 mm. The dimensions of the magnetic base body 10 are not limited to those specified herein. The term "rectangular parallelepiped" or "rectangular parallelepiped shape" used herein is not intended to mean solely "rectangular parallelepiped" in a mathematically strict sense.

The magnetic base body 10 has a first principal surface 10*a*, a second principal surface 10*b*, a first end surface 10*c*, a second end surface 10*d*, a first side surface 10*e*, and a second side surface 10*f*. The outer surface of the magnetic base body 10 is defined by these six surfaces. The first principal surface 10*a* and the second principal surface 10*b* are surfaces at the opposite ends in the height direction, the first end surface 10*c* and the second end surface 10*d* are surfaces at the opposite ends in the length direction, and the first side surface 10*e* and the second side surface 10*f* are surfaces at the opposite ends in the width direction.

As shown in FIG. 1, the first principal surface 10*a* lies on the top side of the magnetic base body 10, and therefore, the first principal surface 10*a* may be herein referred to as "the top surface." Similarly, the second principal surface 10*b* may be referred to as "the bottom surface." The coil component 1 is disposed such that the first principal surface 10*a* faces the circuit board, and therefore, the first principal surface 10*a* may be herein referred to as "the mounting surface." The top-bottom direction of the coil component 1 refers to the top-bottom direction in FIG. 1.

Figure 2:
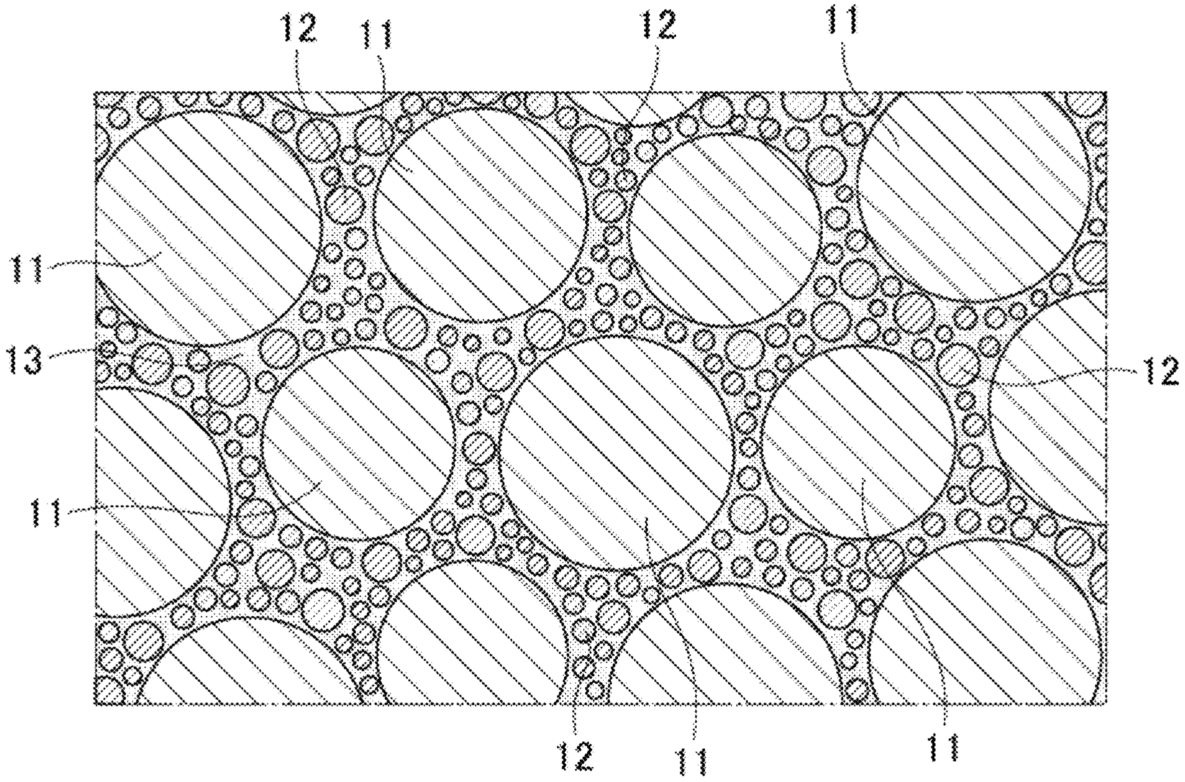
FIG. 2 is an enlarged sectional view schematically showing, on an enlarged scale, a sectional surface of a magnetic base body of the coil component shown in FIG. 1.

Next, the magnetic base body 10 will be further described with reference to FIG. 2. FIG. 2 is an enlarged sectional view schematically showing, on an enlarged scale, a sectional surface of the magnetic base body 10. As shown in the drawing, the magnetic base body 10 contains a plurality of first metal magnetic particles 11, a plurality of second metal magnetic particles 12, and a binder 13. The binder 13 binds together the plurality of first metal magnetic particles 11 and the plurality of second metal magnetic particles 12. In other words, the magnetic base body 10 is formed of the binder 13 and the plurality of first metal magnetic particles 11 and the plurality of second metal magnetic particles 12 bound to each other by the binder 13.

The plurality of first metal magnetic particle 11 have a larger average particle size than the plurality of second metal magnetic particles 12. That is, the average particle size of the plurality of first metal magnetic particles 11 (hereinafter referred to as the first average particle size) is different from the average particle size of the plurality of second metal magnetic particles 12 (hereinafter referred to as the second average particle size). For example, the first average particle size is 30 μm, and the second average particle size is 0.1 μm, but these are not limitative. In one embodiment of the present invention, the magnetic base body 10 may further contain a plurality of third metal magnetic particles (not shown) having an average particle size different from the first average particle size and the second average particle size (the average particle size of the third metal magnetic particles is hereinafter referred to as the third average particle size). The third average particle size may be smaller than the first average particle size and larger than the second average particle size, or it may be smaller than the second average particle size. The first metal magnetic particles 11, the second metal magnetic particles 12, and the third metal magnetic particles may be hereinafter collectively referred to as "the metal magnetic particles" when they need not be distinguished from one another.

The first metal magnetic particles 11 and the second metal magnetic particles 12 can be formed of various soft magnetic materials. For example, a main ingredient of the first metal magnetic particles 11 is Fe. Specifically, the first metal magnetic particles 11 are particles of (1) a metal such as Fe or Ni, (2) a crystalline alloy such as an Fe—Si—Cr alloy, an Fe—Si—Al alloy, or an Fe—Ni alloy, (3) an amorphous alloy such as an Fe—Si—Cr—B—C alloy or an Fe—Si—Cr—B alloy, or (4) a mixture thereof. The composition of the metal magnetic particles contained in the magnetic base body 10 is not limited to those described above. The first metal magnetic particles 11 may contain, for example, 85 wt % or more Fe. This provides the magnetic base body 10 with an excellent magnetic permeability. The composition of the second metal magnetic particles 12 is either the same as or different from that of the first metal magnetic particles 11.

When the magnetic base body 10 contains the plurality of third metal magnetic particles (not shown), the composition of the third metal magnetic particles is either the same as or different from that of the first metal magnetic particles 11, as with the second metal magnetic particles 12.

The surfaces of the metal magnetic particles may be coated with insulating films (not shown). The insulting films are formed of, for example, a glass, a resin, or other materials having an excellent insulating quality. For example, the insulting films are formed on the surfaces of the first metal magnetic particles 11 by mixing the first metal magnetic particles 11 with powder of a glass material in a friction mixer (not shown). The insulating films formed of the glass material are adhered to the surfaces of the first metal magnetic particles 11 by the compression friction action in the friction mixer. The glass material may contain ZnO and $P_2O_5$. The insulating films may be formed of various glass materials. The insulating films 14 may be formed of alumina powder, zirconia powder, or other oxide powders having an excellent insulating quality, in place of or in addition to the glass powder. The thickness of the insulating films is, for example, 100 nm or smaller. The second metal magnetic particles 12 may be coated with different insulating films than the first metal magnetic particles 11. The insulating films may be oxide films made of an oxide of the second metal magnetic particles 12. The thickness of these insulating films is, for example, 20 nm or smaller. These insulating films may be oxide films formed on the surfaces of the second metal magnetic particles 12 by heat-treating the second metal magnetic particles 12 in the atmosphere. These insulating films may be oxide films containing an oxide of Fe or other elements contained in the second metal magnetic particles 12. These insulating films may be iron phosphate films formed on the surfaces of the second metal magnetic particles 12 by placing the second metal magnetic particles 12 into phosphoric acid and stirred. The insulating films of the first metal magnetic particles 11 may be oxide films formed of an oxide of the first metal magnetic particles 11, whereas the insulating films of the second metal magnetic particles 12 may be coating films formed by a method other than oxidation of the second metal magnetic particles 12.

The binder 13 is, for example, a thermosetting resin having an excellent insulating quality. Examples of the binder 13 include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PB 0) resin.

The conductor 25 is formed in a pattern. In the embodiment shown, the conductor 25 is wound around the coil axis Ax. When seen from above, the conductor 25 has, for example, a spiral shape, a meander shape, a linear shape or a combined shape of these.

The conductor 25 is formed by plating with Cu, Ag, or other conductive materials. The entire surface of the conductor 25 other than an end surface **25*a*2 and an end surface 25*b*2 may be coated with an insulating film. As shown, when the conductor 25 is wound around the coil axis Ax for a plurality of turns, each of the turns of the conductor 25 may be separated from adjacent turns. In this arrangement, the magnetic base body 10** mediates between the adjacent turns.

The conductor 25 includes a lead-out conductor **25*a*1 at one end portion thereof and a lead-out conductor 25*b*1 at the other end portion thereof. The lead-out conductor 25*a*1 has the end surface 25*a*2 at an end portion thereof, and the lead-out conductor 25*b*1 has the end surface 25*b*2 at an end portion thereof. The coil conductor 25 is electrically connected to the external electrode 21 via the lead-out conductor 25*a*1 and is electrically connected to the external electrode 22 via the lead-out conductor 25*b*1**.

In one embodiment of the present invention, the external electrodes 21, 22 are provided on the same surface of the magnetic base body 10, that is, the mounting surface **10*a*. Shapes and arrangements of the external electrodes 21, 22 are not limited to those shown as an example. The external electrodes 21, 22** are spaced apart from each other.

The external electrode 21 includes a metal film **21*a* and a conductive body portion 21*b*. The conductive body portion 21*b* is connected to the lead-out conductor 25*a*1 via the metal film 21*a*. The external electrode 22 includes a metal film 22*a* and a conductive body portion 22*b*. The conductive body portion 22*b* is connected to the lead-out conductor 25*b*1 via the metal film 22*a*. In one embodiment of the present invention, the metal film 22*a* and the conductive body portion 22*b* of the external electrode 22 have the same functions, materials, and shapes as the metal film 21*a* and the conductive body portion 21*b* of the external electrode 21. The following description on the external electrode 21 also applies to the external electrode 22 unless in specific cases. Also, FIGS. 3 to 6, which show the external electrode 21, also apply to the external electrode 22**.

The metal film **21*a* is made of, for example, a metal such as Ag, Au, Pd, Pt, Cu, Ni, Ti, and Ta or an alloy of these metals. Besides these materials, any materials that have an excellent conductivity can be used for the metal film 21*a*. Metals suitable for the metal film 21*a* are less apt to oxidation or ready to be reduced after oxidation. The materials of the metal film 21*a* should preferably have a low volume resistivity. The thickness of the metal film 21*a* is, for example, 3 μm or smaller, but this is not limitative. The ionization tendency of the main ingredient of the metals contained in the metal film 21*a* should preferably be smaller than that of the metals constituting the end surface 25*a*2. The phrase "the main ingredient of the metals contained in the metal film 21*a*" refers to the metal ingredient that makes up more than a half of the metal species by weight percent among the metals contained in the metal film 21*a*. When the metal film 21*a* contains one metal, this metal is the main ingredient. For example, when the end surface 25*a*2 is made of Cu, the metal contained in the metal film 21*a*** is Ag.

The body portion **21*b* of the external electrode 21, which needs to be connected to the lead-out conductor 25*a*1 via the metal film 21*a*, is either entirely made of a metal or partially made of a non-metal material such as a resin. An example of the body portion 21*b*** partially made of a non-metal material such as a resin is a conductive resin film. The conductive resin film may have, for example, a plating layer provided on the surface thereof. The plating layer provided may be composed of, for example, a single plating layer such as a Ni plating layer and a Sn plating layer, or two plating layers including a Ni plating layer and a Sn plating layer formed on the Ni plating layer.

Figure 3:
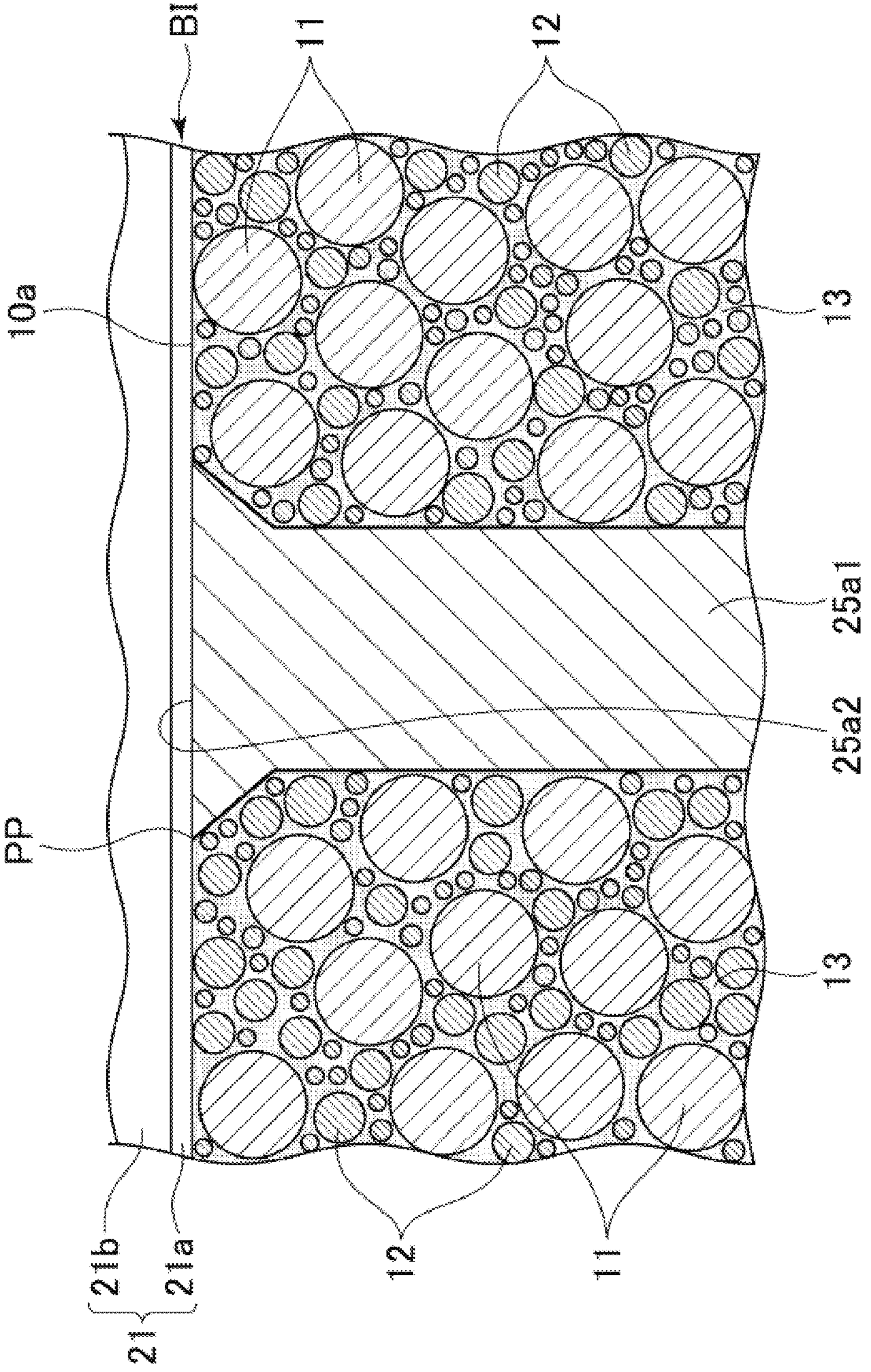
FIG. 3 is an enlarged sectional view schematically showing, on an enlarged scale, a sectional surface around the joint between an end portion of a conductor and an external electrode of the coil component shown in FIG. 1.
Figure 4:
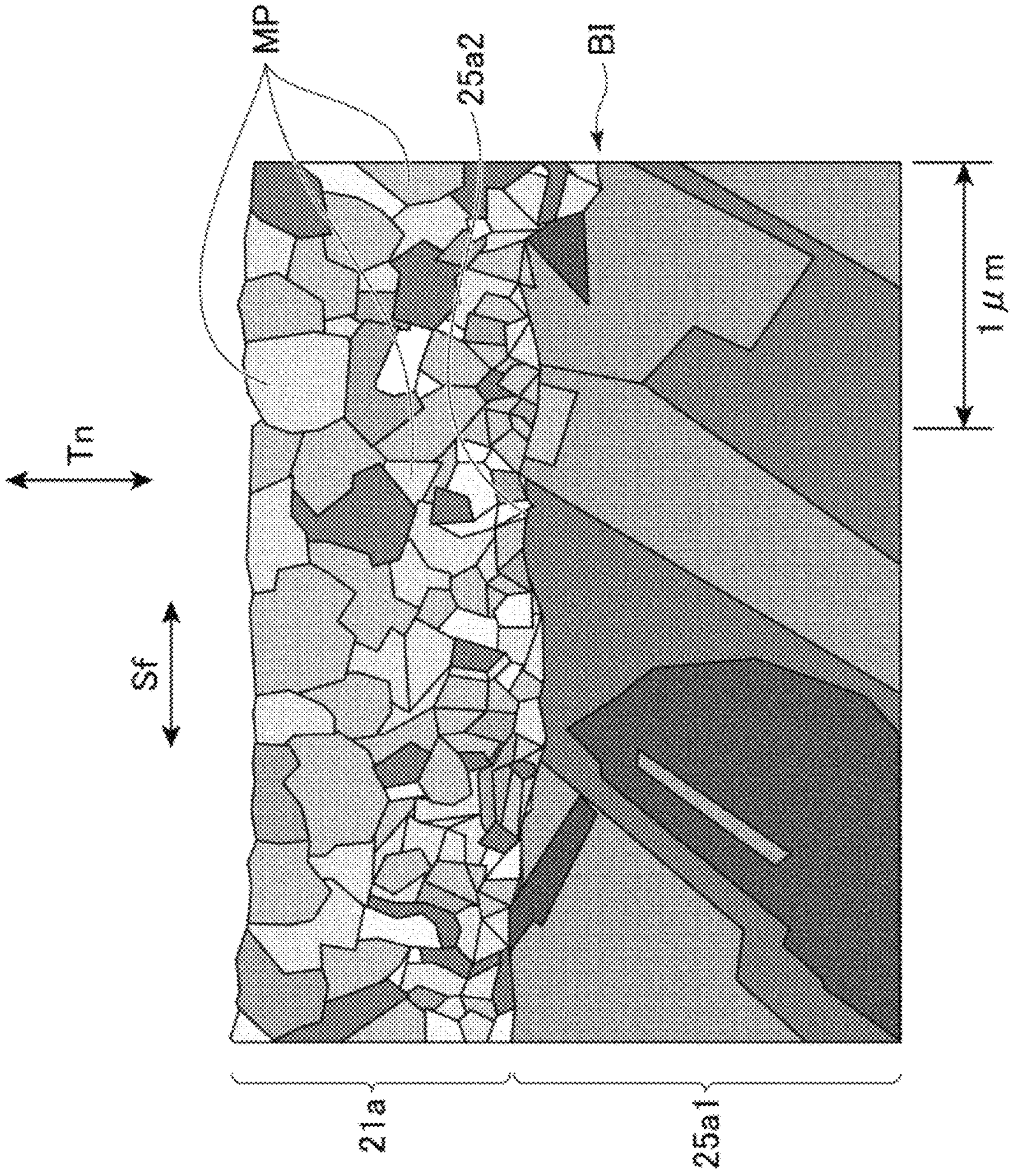
FIG. 4 is a schematic view showing an electron microscopy image of a sectional surface of the joint between the end portion of the conductor and a metal film of the external electrode of the coil component shown in FIG. 1.
Figure 5:
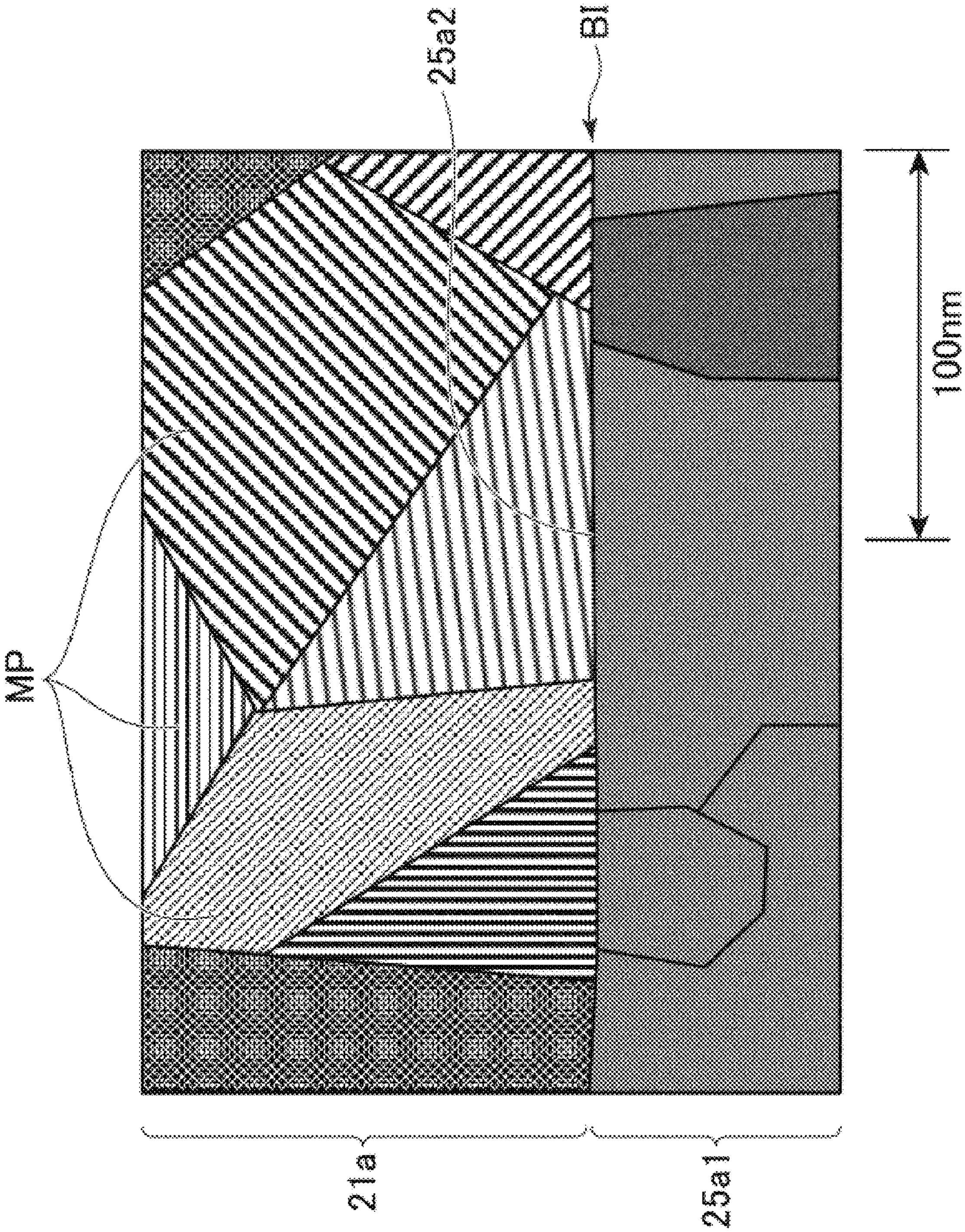
FIG. 5 is a schematic view showing a transmission electron microscopy image of a sectional surface of the joint between the end portion of the conductor and the metal film of the external electrode of the coil component shown in FIG. 1.

Next, with reference to FIGS. 3 to 6, a description is given of a joint between the end surface **25*a*2 of the conductor 25 and the metal film 21*a* of the external electrode 21. FIG. 3 is an enlarged sectional view schematically showing, on an enlarged scale, a sectional surface around the joint between the end surface 25*a*2 of the conductor 25 and the external electrode 21 of the coil component 1. FIG. 4 is a schematic view showing an electron microscopy image of a sectional surface of the joint between the end surface 25*a*2 of the conductor 25 and the metal film 21*a*** of the external electrode 21 of the coil component 1. FIG. 5 is a schematic view showing a transmission electron microscopy image of a sectional surface of the joint between the end surface 25*a*2 of the conductor 25 and the metal film 21*a* of the external electrode 21 of the coil component 1. The metal film 21*a* is metal-bonded to at least a part of the end surface 25*a*2. The phrase “at least a part” mentioned here refers to any region of the end surface 25*a*2. For example, the metal film 21*a* may be metal-bonded to a peripheral portion PP of the end surface 25*a*2 (see FIG. 3). FIG. 3 shows an example in which the body portion 21*b* is connected to the entirety of the end surface 25*a*2 via the metal film 21*a* by metallic bond. In this example, the metal film 21*a* is metal-bonded to the end surface 25*a*2 including the peripheral portion PP. The aspect ratio of the metal particles MP constituting the metal film 21*a* should preferably be, for example, 0.8 to 1.5. The aspect ratio of a metal particle MP mentioned here refers to a value obtained by dividing the length of the metal particle MP in the longitudinal direction (the Tn direction in FIG. 4) that is the thickness direction of the metal film 21*a* by the width of the metal particle MP in the plane direction of the end surface 25*a*2 (the Sf direction in FIG. 4, or the transverse direction that is horizontal to the surface of the metal film 21*a*). The aspect ratio of the metal particles MP may also be an average of aspect ratios of, for example, five, ten, or other plural number of metal particles MP.

Figure 6:
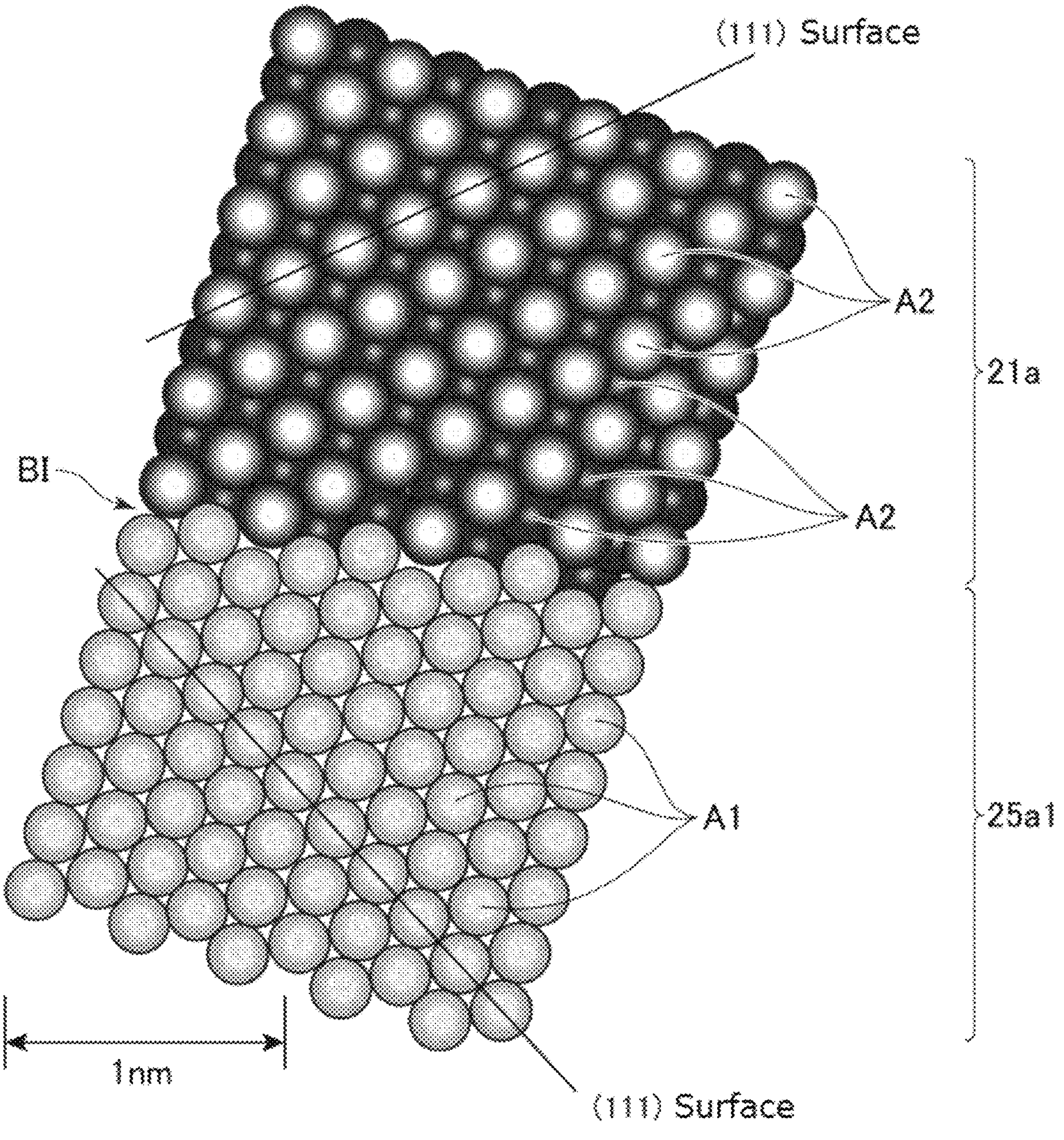
FIG. 6 is an enlarged sectional view of the joint between the end portion of the conductor and the metal film of the external electrode of the coil component shown in FIG. 1.

FIG. 6 is an enlarged sectional view of the joint between the end surface 25*a*2 of the conductor 25 and the metal film 21*a* of the external electrode 21 of the coil component 1. As shown, at the bonding interface BI, a plurality of metal atoms A1 are metal-bonded to a plurality of metal atoms A2. The plurality of metal atoms A1 constituting the lead-out conductor 25*a*1 are arrayed periodically. In other words, cations of the metal atoms A1 constituting the lead-out conductor 25*a*1 are arranged periodically at lattice points of a crystal in a crystallographically determined arrangement. The plurality of metal atoms A2 constituting the metal film 21*a* are also arrayed periodically. In other words, cations of the metal atoms A2 constituting the metal film 21*a* are also arranged periodically at lattice points of a crystal in a crystallographically determined arrangement. In the end surface 25*a*2, the plurality of metal atoms A1 are arranged to form indentations on an atomic scale. Of the plurality of metal atoms A2 constituting the metal film 21*a*, the metal atoms A2 positioned closest to the end surface 25*a*2 form indentations that fit with the indentations of the end surface 25*a*2.

In contrast, the plating layer made by plating is not formed of such a dense film as in the metal film 21*a* of the embodiment of the present invention. Therefore, in the interface between the plating layer and the end surface of the external electrode, the metal atoms constituting the plating layer are not arranged periodically unlike those in the metal film 21*a* metal-bonded to one another. Metal oxides or voids made by lacking of metal atoms may be present in and around the interface. Supplemental ingredients in the plating solution such as phosphorus (P) may also be present. Since metal oxides, voids, or phosphorus atoms from the plating solution are present in the interface between the plating layer and the lead-out conductor 25*a*1, the metal atoms constituting the plating layer in this interface are arranged at different positions from those of the metal atoms metal-bonded to one another. Due to this disturbance of the arrangement of the metal atoms (the difference of positions from those in the metallic bond), it is regarded that the plating layer and the lead-out conductor 25*a*1 are not metal-bonded. Since metal oxides, voids, or phosphorus atoms from the plating solution as mentioned above are present in the interface between the plating layer and the lead-out conductor 25*a*1, the plating layer and the lead-out conductor 25*a*1 are not metal-bonded, resulting in reduced reliability in electrical and mechanical connection in the interface between the plating layer and the lead-out conductor 25*a*1.

As for the embodiment of the present invention, unlike the above-mentioned case using the plating layer, the bonding interface BI is formed of the plurality of metal atoms A1 and the plurality of metal atoms A2 metal-bonded to each other, and no impurities or voids are present in the bonding interface BI. By way of an example, the interior of the lead-out conductor 25*a*1 is not necessarily formed by metallic bond. On the lead-out conductor 25*a*1 side, the plurality of metal atoms A1 are smoothly exposed to the bonding interface BI The plurality of metal atoms A2 constituting the metal film 21*a* are arrayed periodically. The plurality of metal atoms A1 of the end surface 25*a*2 smoothly exposed to the bonding interface BI and the plurality of metal atoms A2 constituting the metal film 21*a* are metal-bonded to each other so as not to have impurities or voids between them.

Next, a description is given of a method of forming the metal film 21*a* on the end surface 25*a*2 of the conductor 25. The end surface 25*a*2 is previously smoothened and cleaned of oxides. By way of an example, the end surface 25*a*2 may be polished with an abrasive and then subjected to plasma etching. The particle size of the abrasive should preferably be smaller than that of the first metal magnetic particles 11. For example, when the average particle size of the first metal magnetic particles 11 is 30 μm, an abrasive having a particle size of 25 μm is selected. One example of the method of forming the metal film 21*a* is sputter deposition, or in particular, high density sputter deposition. In high density sputter deposition, a large electric power is applied for a short period to form a dense film while preventing overheating of the sputtered film. When the sample is cooled during sputtering, a larger electric power can be applied to form more dense sputtered film. With the above metals used in this method, the metal film 21*a* can be formed efficiently at a high sputtering yield. The metal film formed by sputter deposition is herein referred to as a sputtered film. The metal film 21*a* may alternatively be formed by methods other than sputter deposition capable of metallic bond between the end surface 25*a*2 of the conductor 25 and the metal film 21*a*.

In the metal film 21*a* formed by sputter deposition, the metal particles MP constituting the metal film 21*a* have a small particle size. This makes the metal film 21*a* dense, as shown in FIG. 4. By way of a specific example, the metal particles MP have an average particle size of 10 nm to 50 nm in the region from the bonding interface BI to the thickness of the metal film 21*a* of 200 nm, an average particle size of 50 nm to 150 nm in the region of the thickness of the metal film 21*a* from 200 nm to 500 nm, and an average particle size of 150 nm to 300 nm in the region of the thickness of the metal film 21*a* from 500 nm onward. In this method, the metal particles MP constituting the metal film 21*a* have an aspect ratio of, for example, 0.8 to 1.5 in the thickness direction of the metal film 21*a*. Therefore, the metal film 21*a* can be a dense film in which the proportion (density) of the metal particles MP in the metal film 21*a* is 99% or larger. This proportion can be confirmed when it is observed under a transmission electron microscope (TEM) that the proportion of voids in a bright-field image at a magnification of 500,000 is less than 1%. Therefore, the metal film 21*a* formed by sputter deposition does not contain oxides.

When this method is performed with a sputtering apparatus (not shown), the apparatus is set as follows. First, the component is set in the apparatus, and the apparatus is evacuated to a high vacuum to remove oxygen from the apparatus, Rare gases are ionized, and the film formation surface is cleaned by reverse sputtering. Then, a metal target (a metal for making the metal films 21*a*, 22*a*) is sputtered. The metal atoms recoiling from the metal target are deposited on the mounting surface 10*a* of the component body with high energy. In this way, sputter deposition is capable of forming the metal film 21*a* containing less impurities and no oxides. Since the end surface 25*a*2 of the lead-out conductor 25*a*1 and the end surface 25*b*2 of the lead-out conductor 25*b*1 are exposed in the mounting surface 10*a*, the metal films 21*a*, 22*a* can be formed at the same time by this method. In addition, metal materials apt to oxidation can be used. In particular, when the ionization tendency of the metal of the metal target is smaller than that of the metal of the end surfaces 25*a*2, 25*b*2, the metal atoms recoiling from the metal target is more apt to oxidation than the metal of the end surface 25*a*2. Therefore, the metal film 21*a* containing no oxides can be formed.

The metal film 21*a* according to one embodiment obtained in the above manner is made of fine metal particles MP and thus is dense and contains very few impurities. This makes it possible to prevent cracking due to repeated thermal stresses caused by environmental change over time. Accordingly, the decrease in mechanical strength and the increase in electrical resistance can be prevented. In addition, in one embodiment, the metal film 21*a* and the end surface 25*a*2 of the conductor 25 are metal-bonded (see FIG. 6). Therefore, the external electrode 21 is bonded more firmly to the end surface 25*a*2 than in the case where the joint between the external electrode 21 and the end surface 25*a*2 is formed of a conductive resin layer. It can be confirmed, for example, under a transmission electron microscope (TEM) in a bright-field image at a magnification of 500,000 whether the metallic bond is formed in the bonding interface BI, as in the example shown in FIG. 5.

When a plating layer is formed by plating, which does not accord to one embodiment of the present invention, the plating layer having a thickness of 3 μm or smaller, for example, results in an insufficient density and reduced tightness in the bonding. Further, when a plating layer is formed by plating, oxygen permeates the plating layer. Therefore, plating results in reduced tightness in the bonding due to oxidation of the plating layer. The proportion of the metal particles MP in the plating layer formed by plating is less than 99%, indicating less density than for the sputter deposition according to one embodiment of the present invention.

Next, a description is given of an example of a manufacturing method of the coil component 1. The conductor 25 formed of a metal material or the like and having a coil shape is placed into a mold, along with a mixed resin composition prepared by mixing and kneading particles including the first metal magnetic particles 11 and the second metal magnetic particles 12 with the binder 13 composed of a resin or the like. This is then compression molded such that the end surface 25*a*2 of the lead-out conductor 25*a*1 and the end surface 25*b*2 of the lead-out conductor 25*b*1 of the conductor 25 are exposed in the surface. The coil shape of the conductor 25 is not particularly limited. For example, the conductor 25 is made of a wire wound in a spiral shape, or it may be made of a planar coil instead of the wound wire. The conductor 25 may have an insulating coat. The resin in the molded product is cured to obtain the magnetic base body 10 having the conductor 25 embedded therein.

Next, the magnetic base body 10 is polished and etched at the surface thereof in which the end surface 25*a*2 of the lead-out conductor 25*a*1 and the end surface 25*b*2 of the lead-out conductor 25*b*1 of the conductor 25 are exposed. Any etching method, such as plasma etching, is available that can remove oxides from the surface of the magnetic base body. Then, the external electrodes 21, 22 are formed on the end surface 25*a*2 of the lead-out conductor 25*a*1 and the end surface 25*b*2 of the lead-out conductor 25*b*1 of the conductor 25 by the sputter deposition described above. The coil component 1 is manufactured in this manner. The coil component 1 manufactured is mounted on the circuit board by soldering the external electrodes 21, 22 to the corresponding land portions of the circuit board.

Figure 7:
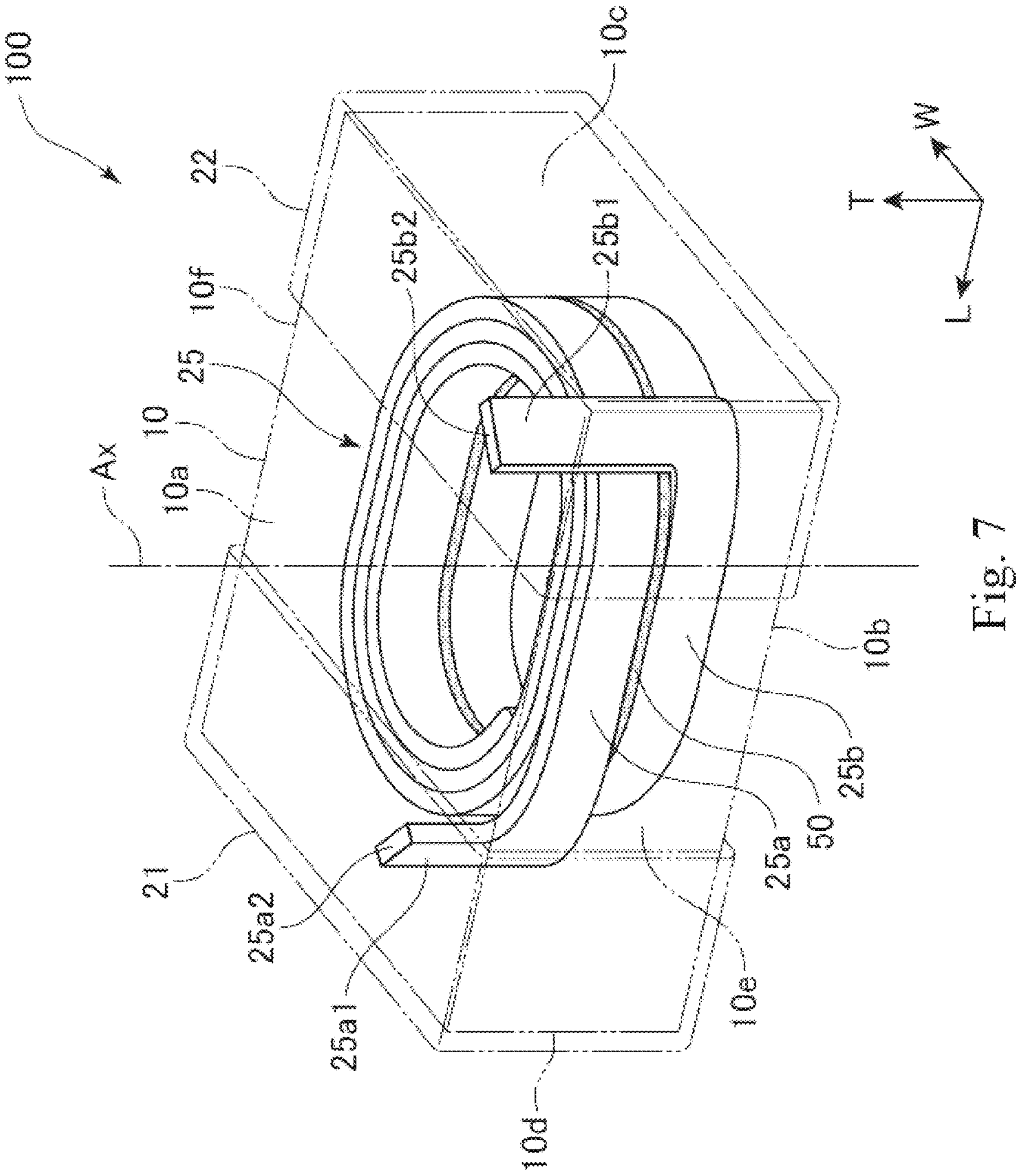
FIG. 7 is a perspective view schematically showing a coil component according to another embodiment of the present invention.

Next, a description is given of a coil component 100 according to another embodiment of the present invention with reference to FIG. 7. The coil component 100 is different from the coil component 1 according to one embodiment in the following points. First, with reference to FIG. 7, an outline is given of the coil component 100. FIG. 7 is a perspective view schematically showing the coil component 100. As shown, the coil component 100 includes a magnetic base body 10, an insulating plate 50 provided in the magnetic base body 10, a coil conductor 25 disposed in the magnetic base body 10 so as to be positioned on the top surface and the bottom surface of the insulating plate 50, an external electrode 21 disposed on the surface of the magnetic base body 10, and an external electrode 22 disposed on the surface of the magnetic base body 10 at a position spaced apart from the external electrode 21.

The conductor 25 includes a conductor 25*a* formed on the top surface of the insulating plate 50 and a conductor 25*b* formed on the bottom surface of the insulating plate 50. The conductor 25*a* and the conductor 25*b* are connected to each other through a via (not shown). The conductor 25*a* is formed in a predetermined pattern on the top surface of the insulating plate 50, and the conductor 25*b* is formed in a predetermined pattern on the bottom surface of the insulating plate 50. In the embodiment shown, the conductor 25*a* and the conductor 25*b* are wound around the coil axis Ax. When seen from above, the conductor 25 has, for example, a spiral shape, a meander shape, a linear shape or a combined shape of these.

Each of the conductor 25*a* and the conductor 25*b* is formed by plating with Cu, Ag, or other conductive materials.

The conductor 25*a* includes a lead-out conductor 25*a*1 at one end portion thereof, and the conductor 25*b* includes a lead-out conductor 25*b*1 at one end portion thereof. The lead-out conductor 25*a*1 has an end surface 25*a*2 at an end portion thereof, and the lead-out conductor 25*b*1 has an end surface 25*b*2 at an end portion thereof. The coil conductor 25 is electrically connected to the external electrode 21 via the lead-out conductor 25*a*1 and is electrically connected to the external electrode 22 via the lead-out conductor 25*b*1.

The insulating plate 50 is made of an insulating material and has a plate-like shape. The insulating material used for the insulating plate 50 may be magnetic. The magnetic material used for the insulating plate 50 is, for example, a composite magnetic material containing a binder 13 and metal magnetic particles. The insulating plate 50 has a larger resistance than the magnetic base body 10. Thus, even when the insulating plate 50 has a small thickness, electric insulation between the coil conductor 25*a* and the coil conductor 25*b* can be ensured (described later).

Next, a description is given of an example of a manufacturing method of the coil component 100 according to the other embodiment of the present invention. The coil component 100 is characterized in that the conductor 25 is formed by a thin film process. To start with, an insulating plate made of a magnetic material and shaped like a plate is prepared. Next, a photoresist is applied to the top surface and the bottom surface of the insulating plate, and then conductor patterns are transferred onto the top surface and the bottom surface of the insulating plate by exposure, and development is performed. As a result, a resist having an opening pattern for forming a coil conductor is formed on each of the top surface and the bottom surface of the insulating plate. For example, the conductor pattern formed on the top surface of the insulating plate corresponds to the conductor 25*a* described above, and the conductor pattern formed on the bottom surface of the insulating plate corresponds to the conductor 25*b* described above. A through-hole for the via is formed in the insulating plate.

Next, plating is performed, so that each of the opening patterns is filled with a conductive metal. Next, etching is performed to remove the resists from the insulating plate, so that the coil conductors are formed on the top surface and the bottom surface of the insulating plate. The through-hole formed in the insulating plate is filled with a conductive metal to form the via connecting the conductor 25*a* and the conductor 25*b*.

A magnetic base body is then formed on both surfaces of the insulating plate having the conductors formed thereon. This magnetic base body corresponds to the magnetic base body 10 described above. To form the magnetic base body, magnetic sheets are first fabricated. The magnetic sheets are fabricated by mixing and kneading particles including the first metal magnetic particles 11 and the second metal magnetic particles 12 with a resin while heating them to form a mixed resin composition, placing the mixed resin composition into a sheet-shaped mold, and then cooling the mixed resin composition in the sheet-shaped mold. After the magnetic sheets are fabricated in this manner, the magnetic sheets and the conductor placed between the magnetic sheets are pressurized with heat to form a laminated body. Next, the laminated body is subjected to heat treatment for curing the resin. In this way, the magnetic base body 10 having the conductor 25 therein can be obtained. In the magnetic base body 10, the resin in the mixed resin composition is cured to be the binder 13. The binder 13 binds together the plurality of first metal magnetic particles 11 and the plurality of second metal magnetic particles 12 contained in the mixed resin composition.

Next, the magnetic base body 10 is polished and etched at the surface thereof in which the end surface 25*a*2 of the lead-out conductor 25*a*1 of the conductor 25*a* and the end surface 25*b*2 of the lead-out conductor 25*b*1 of the conductor 25*b* are exposed. Any etching method, such as plasma etching, is available that can remove oxides from the surface of the magnetic base body. Then, the external electrodes 21, 22 are formed on the end surface 25*a*2 of the lead-out conductor 25*a*1 of the conductor 25*a* and the end surface 25*b*2 of the lead-out conductor 25*b*1 of the conductor 25*b* by the sputter deposition described above. The coil component 100 is manufactured in this manner. The coil component 100 manufactured is mounted on the circuit board by soldering the external electrodes 21, 22 to the corresponding land portions of the circuit board.

Advantageous effects of the above embodiments will now be described. In the embodiments of the present invention, the external electrode 21 includes the metal film 21*a* and the body portion 21*b*, and the body portion 21*b* is metal-bonded to the end surface 25*a*2 of the conductor 25 via the metal film 21*a*. With this arrangement of the coil component 1 according to one embodiment of the present invention, the external electrode 21 is connected to the end surface 25*a*2 more firmly than in the case where the end surface 25*a*2 of the external electrode 21 is connected directly to the conductive resin layer and the case where the metal film 21*a* is formed of a plating layer. In addition, since oxygen is absent in the bonding interface BI between the end surface 25*a*2 and the metal film 21*a*, oxidation is prevented or inhibited in the bonding interface BI. For these reasons, the coil components 1, 100 according to the embodiments of the present invention are safe from reduction of reliability of bonding between the end surface 25*a*2 and the external electrode 21. In particular, when the metal film 21*a* is formed on the end surface 25*a*2 and the region outside the end surface 25*a*2, the contact area between the metal film 21*a* and the end surface 25*a*2 is smaller than the contact area between the metal film 21*a* and the body portion 21*b*. Because of this arrangement, the change of electric resistance of the external electrode 21 is more conspicuous with the change of the contact area between the metal film 21*a* and the end surface 25*a*1 than with the change of the contact area between the metal film 21*a* and the body portion 21*b*. Accordingly, the above advantageous effects are particularly significant in these embodiments.

In the embodiments of the present invention, the aspect ratio of the metal particles MP in the metal film 21*a* is, for example, 0.8 to 1.5. Therefore, the metal film 21*a* is a dense film containing 99% or more metal particles MP. This allows the metal film 21*a* of the embodiments of the present invention to have a smaller thickness than in the case where it is formed by a plating film. Further, as the aspect ratio is larger, the metal film is more apt to crack along the thickness direction thereof. In other words, as the aspect ratio is larger, the metal film is more apt to break. Therefore, in one embodiment of the present invention, the external electrode 21 is less apt to come off.

The dimensions, materials, and arrangements of the constituent elements described for the above various embodiments are not limited to those explicitly described for the embodiments, and these constituent elements can be modified to have any dimensions, materials, and arrangements within the scope of the present invention. Furthermore, constituent elements not explicitly described herein can also be added to the above-described embodiments, and it is also possible to omit some of the constituent elements described for the embodiments.

What is claimed is:

1. A coil component comprising:
- a magnetic base body;
- a conductor provided in the magnetic base body and wound around a coil axis; and
- first and second external electrodes connected by metallic bond to at least parts of first and second end portions of the conductor, respectively,
- wherein the first external electrode includes a first metal film connected outside of the magnetic base body to the first end portion and the second external electrode includes a second metal film connected outside of the magnetic base body to the second end portion,
- wherein the first and second metal films each include metal particles, and
- wherein a density of the metal particles with respect to a total of the metal particles and voids in each of the first and second metal films is 99% or larger.

2. The coil component of claim 1, wherein each metal film is a sputtered film.

3. The coil component of claim 1, wherein an aspect ratio of metal particles contained in each metal film is 0.8 to 1.5, where a longitudinal direction of the metal particles is a thickness direction of the metal film, and a transverse direction of the metal particles is horizontal to a surface of the metal film.

4. The coil component of claim 1, wherein an ionization tendency of a main ingredient of metals contained in the first and second external electrodes is smaller than that of metals contained in the first and second end portions.

5. The coil component of claim 1, wherein the magnetic base body has a surface in which the first and second end portions are exposed.

6. The coil component of claim 1, wherein the first and second end portions have first and second end surfaces, respectively, wherein the first and second external electrodes are connected to the first and second end surfaces, respectively, and wherein the first and second external electrodes are metal-bonded to at least peripheral portions of the first and second end surfaces, respectively.

7. The coil component of claim 1, wherein the external electrodes contain an alloy including Cu, Ag, or at least one of Cu and Ag.

8. A circuit board comprising the coil component of claim 1.

9. An electronic device comprising the circuit board of claim 8.

10. The coil component of claim 1, wherein the metallic bond includes a plurality of metal atoms in the first and second external electrodes metallically bonded to a plurality of metal atoms in the at least parts of first and second end portions.

11. The coil component of claim 1, wherein the conductor includes plated portions;

wherein the metal film of each of the first and second external electrodes is connected by the metallic bond to the first and second end portions of the conductor, the metal film not being plated to form the connections, and wherein the metal film is denser than the plated portions.

* * * * *